United States Patent [19]

Blatt

[11] Patent Number: 4,887,526

[45] Date of Patent: Dec. 19, 1989

[54] AUTOMOBILE TRUNK TABLE

[76] Inventor: Brian L. Blatt, 3808 Kilbourne Hill Rd., Columbia, S.C. 29206

[21] Appl. No.: 323,430

[22] Filed: Mar. 14, 1989

[51] Int. Cl.⁴ .............................................. A47B 37/04
[52] U.S. Cl. .......................................... 108/44; 5/118
[58] Field of Search ............. 108/44; 297/194; 5/118, 5/119; 312/322, 323, 133

[56] References Cited

U.S. PATENT DOCUMENTS

| | | | |
|---|---|---|---|
| 2,132,279 | 10/1938 | Wicknick et al. | 312/322 |
| 2,217,890 | 10/1940 | Cohen | 312/322 X |
| 2,480,304 | 8/1949 | Pelton | 108/45 |
| 2,829,779 | 4/1958 | Weddington | 108/25 X |
| 2,867,471 | 1/1959 | Coon, Jr. | 108/44 X |
| 3,467,432 | 9/1969 | Sullivan | 312/322 X |
| 4,418,626 | 12/1983 | Semien | 108/44 X |
| 4,455,948 | 6/1984 | Torres | 108/44 |
| 4,494,465 | 1/1985 | Fick, Jr. | 108/44 |

Primary Examiner—Peter A. Aschenbrenner
Attorney, Agent, or Firm—Michael A. Mann

[57] ABSTRACT

A folding table for storage in an automobile and used in combination with the trunk of the automobile comprises an upper surface configured for holding items as the table is removed from or returned to the trunk, two adjustable, foldable legs for supporting the front of the table, the back resting on the trunk rim, and a ramp for removal of the table from and return of the table to the trunk. In the preferred embodiment, the ramp is a frame having two tracks that engage and guide two wheels fitted to the back of the table, the frame resting on the rim when being used and laying flat on the trunk floor under the table when being stored. In an alternative embodiment, the ramp comprises two tube carried in the sides of the table, a rod slidably carried within each tube but protruding a short distance from the back of the table and having ends that frictionally engage the trunk floor to maintain position of the rods relative to the floor as the table is slid from and to the trunk.

16 Claims, 3 Drawing Sheets

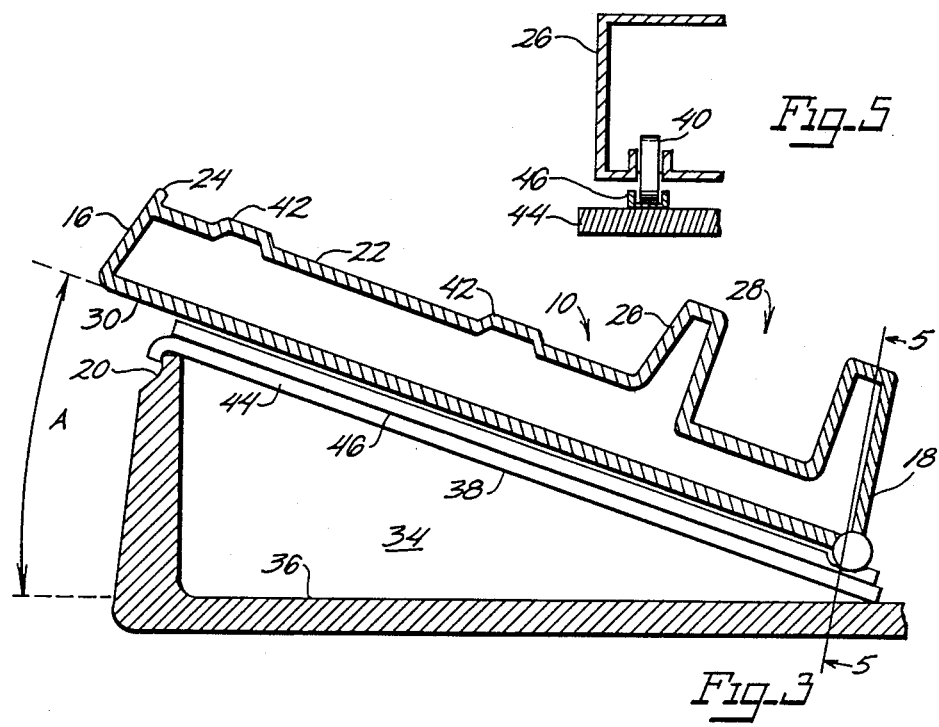
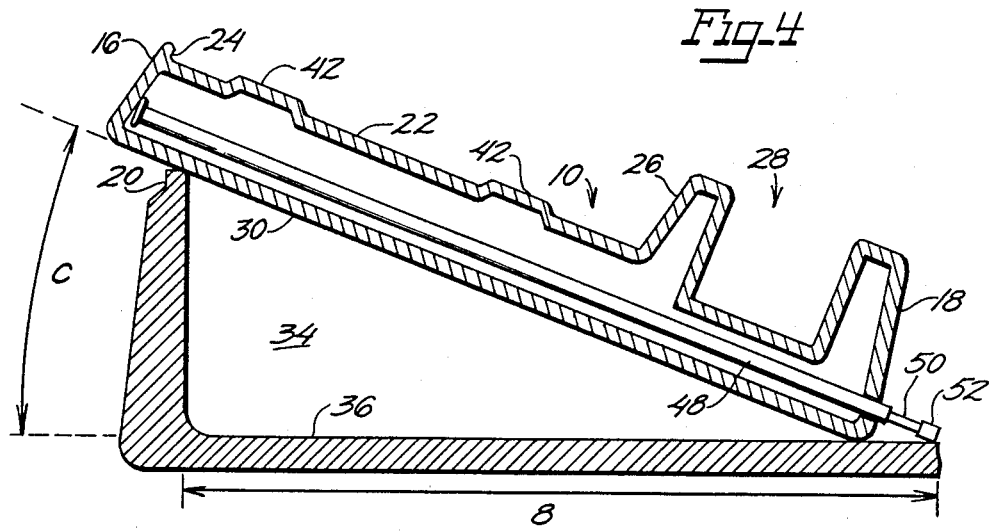

4,887,526

AUTOMOBILE TRUNK TABLE

BACKGROUND OF THE INVENTION

1. Field of the Invention

The present invention relates to storable tables and, more particularly, to storable tables adapted for use in combination with an automobile trunk.

2. Discussion of Background

Tables having folding legs are well known. Many of such tables can be fitted into the trunk of an automobile. Several tables have been designed specifically for use in connection with an automobile trunk. See for example, U.S. Pat. No. 4,494,465 issued to Fick, Jr. for a Table For Use With an Automobile and the Like; Jarrard's Trunk Lid Folding Table disclosed in U.S. Pat. No. 4,452,151; and the Folding Serving Table of Oglesby in U.S. Pat. No. 3,709,159.

However, in using such tables, it is first necessary to set up the table and then put food and containers on it. This necessity requires that the table must either be packed on top of the food and containers in the trunk or that these items must first be removed from the top of the stored table and placed elsewhere temporarily before the table can be set up.

Three problems are associated with packing the items on top of the table in the trunk. The first is that the items can easily fall off while the automobile is in motion or moving over uneven terrain. The second is that there may be no convenient place to temporarily place the items. The third is that if an attempt is made to remove the table from the trunk with the items still on it, it may be too heavy to be conveniently lifted, especially since the lifting must be done at an awkward angle.

Also, although speed in setting up is not usually a criterion in the design of such a table, speed in returning the table to the trunk in the event of rain is a highly desirable feature.

SUMMARY OF THE INVENTION

An objct of the invention is to provide a table for storing in the trunk of an automobile.

Another object of the invention is to provide an automobile trunk-storable table adapted for ease in setting up and in returning to the trunk.

Another object of the invention is to provide a table capable of holding items securely while in the trunk of a moving vehicle.

Still another object of the invention is to provide a table that may be easily removed and returned to an automobile trunk with items on it.

To achieve the foregoing and other objects and in accordance with the purpose of the invention, as embodied and broadly described herein, the invention comprises a table used in combination with an automobile, storable on the floor of the automobile trunk, the table having an upper surface configured to provide lateral support for holding items, especially when the front of the upper surface is raised with respect to the back. The table is supported in the front by foldable, adjustable legs and in the back by the rim of the trunk. The table is removed from, and returned to, the trunk by a ramp that is preferably a flat frame that underlays the table and has two tracks. The ramp is raised manually in the front and seats on the trunk rim. Wheels fitted to the back of the table are guided by the tracks as the upper surface slides up and down the ramp.

In an alternate embodiment, two tubes are carried within the sides of the table having rods therein free to slide within the tubes and which rods protrude a short distance through openings in the back of the upper surface, the ends of the rods frictionally engaging the floor of the trunk to maintain the position of the rods relative to the trunk as the table slides from the trunk and apart from the rods, the rods and tubes supporting the load.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings:

FIG. 1 is a perspective view of the table set up for use according to the present invention.

FIG. 2a, 2b, and 2c show side views of the table with respect to the automobile, the side of the automobile cut away, in the stored position, the position for withdrawing the table from or returning the table to the trunk, and the set up position, respectively.

FIG. 3. shows a more detailed side view of the table in one embodiment of the ramp with wheels and tracks according to the present invention.

FIG. 4 shows a more detailed side view of the table in an alternative embodiment of the ramp with internal rods according to the present invention.

FIG. 5 is a cross-sectional detailed view taken along lines 5—5 of FIG. 3 showing the relationship of wheel and track in one embodiment of the present invention.

DETAILED DESCRIPTION OF THE INVENTION

Figure 1:
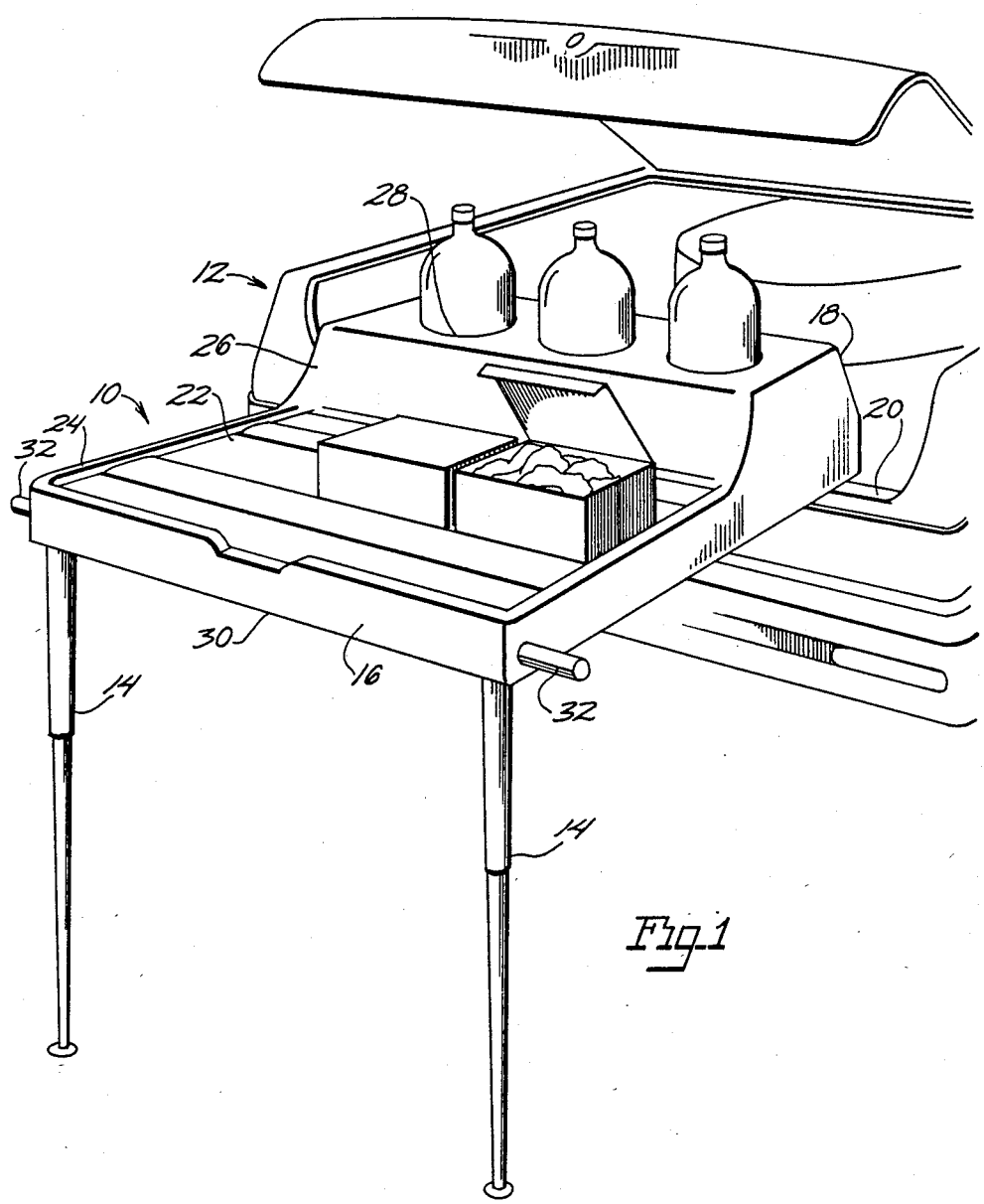

Referring now to the drawings, FIG. 1 shows a table 10 set up in combination with an automobile 12, with two front legs 14 and 14' of table 10 supporting the front 16 and with the back 18 of table 10 supported on trunk rim 20.

An upper surface 22 of table 10 is configured to hold items and provide lateral support for the items when table 10 is being set up or when automobile 12 is in motion. The preferred configurative features of upper surface 22 are a rim 24 along the edge of upper surface 22, preferably having a raised portion 26 at the back 18 of table 10. Raised portion 26 is provides additional lateral support when front 16 is raised relative to back 18 and may be adapted to hold taller items such as bottles, preferably in wells 28.

Legs 14 and 14' are adjustable and foldable so that table 10 can be made level on uneven ground. Preferably, table 10 has a lower surface 30 against which legs 14 and 14' can be folded. Two handles 32 and 32' facilitate the handling of table 10.

Figure 2A:
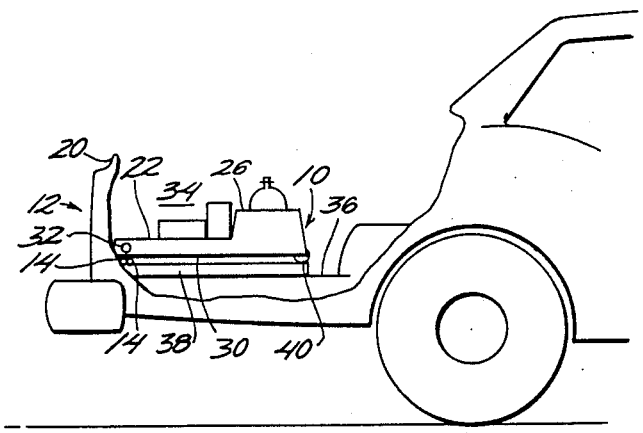
Figure 2B:
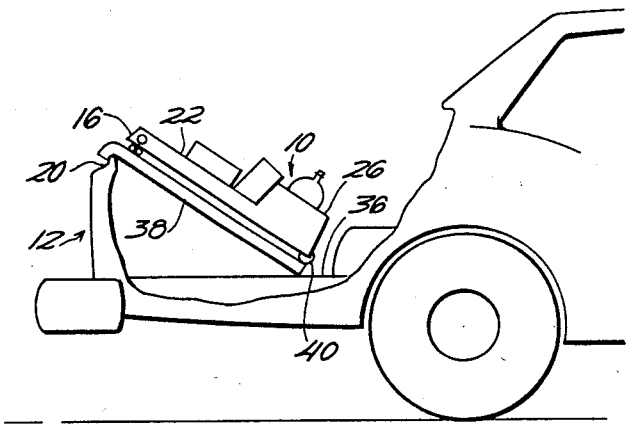
Figure 2C:
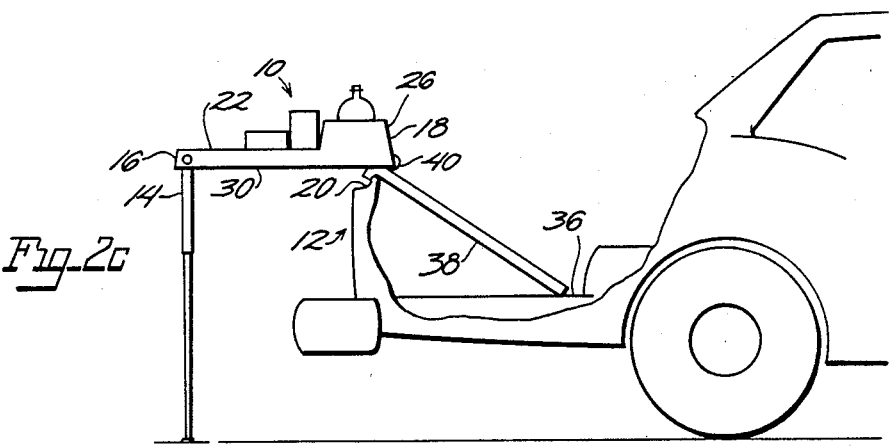

In FIGS. 2a, 2b, and 2c the unloading, loading sequence of table 10 is shown, the side of automobile 12 cut away. In FIG. 2a, table 10 is shown in trunk 34 resting, level, on trunk floor 36. It will be evident that items are securely held in place on table 10 by rim 24, raised portion 26 and wells 28.

Underlaying table 10 in the embodiment shown is a ramp 38. Table 10 is fitted with wheels 40 in back 18 and legs 14 and 14' are in a folded position against lower surface 30.

In FIG. 2b, ramp 38 and thereby table 10 has been lifted and placed on trunk rim 20. Only the front 16 of table 10 must be lifted. Since front 16 is closer to where the person doing the lifting would stand to make the lift, less exertion is required to lift ramp 38 into position or, alternatively, more weight could be lifted by the same level of exertion required to lift all of table 10 vertically.

In FIG. 2c table 10 has been rolled up ramp 38 far enough to unfold legs 14 and 14' for supporting front 16 of table. To return table 10 to trunk 34, the process is reversed: legs 14 and 14' are folded to the underside of table 10 which is rolled down ramp 38 into trunk 34 and ramp 38 can then be lowered to trunk floor 36.

FIG. 3 shows a cross sectional view of table 10 with ramp 38 raising front 16 of upper surface 22 to trunk rim 20. Upper surface 22 can be made in the form of a shell of a light weight material such as molded plastic. Reinforcing features 42 can add stiffness to upper surface 22.

In FIG. 5, which shows a detail of FIG. 3 along lines 5—5, ramp 38 will be seen to have a frame 44 and a track 46 to guide each wheel 40 as table 10 is removed from or returned to trunk 34. Because ramp 38 maintains its position with respect to trunk rim 20, an angle A at which table 10 is raised is limited by the height of trunk rim 20. The upper surface 22 of table 10, especially raised portion 26, is, however, such that items are laterally supported on upper surface 22 when table 10 is raised to Angle A.

An alternate embodiment of the present invention is shown in FIG. 4. Instead of a ramp and wheels, a pair of tubes 48 are carried in the sides of table 10. Within each tube 48 is a sliding rod 50 that protrudes from back 18 of table 10. The end 52 of each rod 50 frictionally engages trunk floor 36, preferably by attaching a rubber bumper cap or other highly frictional end of rod 50. Rods 50 slide easily into and out of tubes 48 so that table 10 slides with respect to rods 50 as well. Thus the ends 52 of rods 50 maintain position with respect to table 10 as it is removed from or returned to trunk 34. The distance B from the point at which ends 52 engage trunk floor 36 to the base of trunk rim 20, plus the height of trunk rim 20 determines Angle C.

It will be obvious that Angles A or C are determined by the dimensions of the table and ramp or rods, respectively, and the trunk rim height and limit the angle at which front 16 of table 10 is raised with respect to back 18, and that the configuration of upper surface 22, especially raised portion 26 must be coordinated with Angles A or C to assure that objects remain on table 10.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A table used in combination with an automobile having a trunk with a trunk floor and a trunk rim, said table comprising:
   an upper surface for holding objects having a front portion and a back portion, said upper surface laterally supporting said objects when said upper surface is not level;
   a lower surface opposite said upper surface;
   means for supporting said front portion attached to said lower surface, said supporting means including at least one leg, said leg having a folded position against said lower surface and a supporting, unfolded position; and
   a ramp means for removing said upper surface from said trunk floor by raising said front portion from said trunk floor to said trunk rim, said upper surface carried by said ramp means.

2. The table of claim 1 wherein said at least one leg is adjustable so that said upper surface may be made level.

3. The table of claim 1 wherein said upper surface further comprises a rim along said upper surface.

4. The table of claim 3 wherein said rim has a raised portion at said back portion for additional lateral support as said front portion is raised relative to said back portion.

5. The table of claim 4 wherein said raised portion is adapted for holding taller items.

6. The table of claim 5 wherein said raised portion contains at least one well for holding a taller item.

7. The table of claim 1 wherein said lower surface has a pair of wheels and said ramp means further comprises:
   a frame for supporting said upper surface and any objects thereo; and
   a pair of parallel tracks attached to said frame, and of said tracks adapted to receive and guide one of said wheels.

8. The table of claim 1 wherein said upper surface includes two hollow tubes extending from said front portion to said back portion of said upper surface, and said ramp means further comprises:
   a rod slidably carried within each of said tubes, each of said rods having an end protruding from said back portion of said upper surface and adapted to frictionally engage said trunk floor so that said rods maintain position relative to said trunk, sliding within said tubes, as said table is removed from said trunk.

9. The table of claim 2, wherein said back portion of said upper surface has a pair of wheels and said ramp means further comprises:
   a frame for supporting said upper surface and any objects thereon; and
   a pair of parallel tracks attached to said frame, each of said tracks adapted to receive and guide one of said wheels.

10. The table of claim 2, wherein said upper surface includes two hollow tubes extending from said front portion to said back portion of said upper surface, and said ramp means further comprises:
    a rod slidably carried within each of said tubes, each of said rods having an end protruding from said back portion of said upper surface and adapted to frictionally engage said trunk floor so that said rods maintain position relative to said trunk, sliding within said tubes, as said table is removed from said trunk.

11. The table of claim 6, wherein said back portion of said upper surface has a pair of wheels and said ramp means further comprises:
    a frame for supporting said upper surface and any objects thereon; and a pair of parallel tracks attached to said frame, each of said tracks adapted to receive and guide one of said wheels.

12. The table of claim 6, wherein said upper surface includes two hollow tubes extending from said front portion to said back portion of said upper surface, and said ramp means further comprises:

a rod slidably carried within each of said tubes, each of said rods having an end protruding from said back portion of said upper surface and adapted to frictionally engage said trunk floor so that said rods maintain position relative to said trunk, sliding within said tubes, as said table is removed from said trunk.

13. The table of claim 6, wherein said at least one leg is adjustable so that said upper surface may be made level.

14. The table of claim 13, wherein said back portion of said upper surface has a pair of wheels and said ramp means further comprises:

a frame for supporting said upper surface and any objects thereon; and a pair of parallel tracks attached to said frame, each of said tracks adapted to receive and guide one of said wheels.

15. The table of claim 13, wherein said upper surface includes two hollow tubes extending from said front portion to said back portion of said upper surface, and said ramp means further comprises:

a rod slidably carried within each of said tubes, each of said rods having an end protruding from said back portion of said upper surface and adapted to frictionally engage said trunk floor so that said rods maintain position relative to said trunk, sliding within said tubes, as said table is removed from said trunk.

16. A method for removing a table from an automobile trunk, said table having a front portion and a back portion, an upper surface configured to provide lateral support for items thereon, a lower surface, means for supporting said front portion attached to said lower surface; and ramp means for removing said upper surface from said trunk floor, said ramp means supporting said upper surface together with any items thereon and adapted to side relative to said upper surface;

said trunk having a trunk rim and a trunk floor, said method comprising the steps of:

raising said front portion with respect to said trunk floor to the approximate height of said rim, said items on said upper surface laterally supported as said front portion is raised;

supporting said ramp means on said trunk rim; and sliding said table relative to said ramp means so that said table is removed from said trunk.

* * * * *